(12) United States Patent
Cheng et al.

(10) Patent No.: US 8,773,045 B1
(45) Date of Patent: Jul. 8, 2014

(54) LIGHT EMITTING DIODE DRIVING DEVICE

(71) Applicant: I Shou University, Kaohsiung (TW)

(72) Inventors: Hung-Liang Cheng, Kaohsiung (TW);
Chao-Shun Chen, Kaohsiung (TW);
Guan-Long Huang, Kaohsiung (TW)

(73) Assignee: I Shou University, Kaohsiung (TW)

( * ) Notice: Subject to any disclaimer, the term of this patent is extended or adjusted under 35 U.S.C. 154(b) by 11 days.

(21) Appl. No.: 13/731,385

(22) Filed: Dec. 31, 2012

(51) Int. Cl.
*G05F 1/00* (2006.01)
*H05B 37/02* (2006.01)
*H05B 39/04* (2006.01)
*H05B 41/36* (2006.01)

(52) U.S. Cl.
USPC ........... 315/307; 315/211; 315/216; 315/297; 315/299

(58) Field of Classification Search
None
See application file for complete search history.

(56) References Cited

U.S. PATENT DOCUMENTS

| | | | |
|---|---|---|---|
| 2009/0021175 A1* | 1/2009 | Wendt et al. | 315/200 R |
| 2012/0229034 A1* | 9/2012 | Yu et al. | 315/186 |
| 2012/0293072 A1* | 11/2012 | Chang et al. | 315/121 |

* cited by examiner

*Primary Examiner* — Anh Tran
(74) *Attorney, Agent, or Firm* — Alan Kamrath; Kamrath IP Lawfirm, P.A.

(57) ABSTRACT

An LED driving device includes a DC to DC converter module and a driving module. The DC to DC converter module includes a full-bridge switching circuit for converting a first DC electric power into an AC electric power, a rectifier circuit for converting the AC electric power into a second DC electric power, and a control circuit for modulating pulse phase of the second DC electric power and for controlling switching operation of the full-bridge switching circuit, such that the second DC electric power has a predetermined voltage value. The driving module is operable to receive the second DC electric power, to output a third DC electric power with a predetermined current value for driving an LED module, and to modulate pulse width of the third DC electric power.

8 Claims, 6 Drawing Sheets

LIGHT EMITTING DIODE DRIVING DEVICE

BACKGROUND OF THE INVENTION

1. Field of the Invention

The invention relates to a driving device, more particularly to a light emitting diode (LED) driving device for driving an LED module.

2. Description of the Related Art

Conventional dimming techniques for adjusting illumination of a light emitting diode (LED) can be classified into two categories, specifically, analog dimming and pulse width modulation (PWM) dimming. Analog dimming for an LED is accomplished by adjusting amount of current flowing through the LED. However, color temperature of light emitted by the LED varies as the amount of current is adjusted.

On the other hand, in PWM dimming, an amount of current flowing through an LED is constant, and the LED is turned on and then, is turned off in a short period of time. Namely, PWM dimming is to adjust duty cycle of the LED, and the illumination of the LED depends on the duty cycle of the LED. Additionally, switching frequency of the LED should be high enough (e.g., more than 100 Hz) to avoid a human-sensible flicker effect.

SUMMARY OF THE INVENTION

Therefore, the object of the present invention is to provide another PWM dimming technique for driving a light emitting diode (LED) module.

Accordingly, an LED driving device of this invention includes a direct current (DC) converter module and a driving module. The DC to DC converter module includes a full-bridge switching circuit, a resonant circuit, a rectifier circuit, and a first control circuit. The full-bridge switching circuit is for receiving a first DC electric power and is for converting the first DC electric power into a first alternating current (AC) electric power. The resonant circuit is electrically connected to the full-bridge switching circuit for receiving the first AC electric power and for filtering out high frequency harmonic components of the first AC electric power to output a second AC electric power. The rectifier circuit is electrically connected to the resonant circuit for receiving the second AC electric power and for converting the second AC electric power to output a second DC electric power. The first control circuit is electrically connected to the full-bridge switching circuit and the rectifier circuit for receiving the second DC electric power from the rectifier circuit, for modulating a voltage of the second DC electric power, and for controlling switching operation of the full-bridge switching circuit according to the voltage thus modulated, such that the rectifier circuit outputs the second DC electric power with a predetermined voltage value. The driving module includes a buck converter circuit and a second control circuit. The buck converter circuit is electrically connected to the rectifier circuit for receiving the second DC electric power therefrom and is operable to buck convert the second DC electric power into a third DC electric power to be provided to the LED module for driving the LED module. The second control circuit is electrically connected to the buck converter circuit and is disposed to receive a square wave signal alternating between two logic levels. The second control circuit is operable to output a control signal to be received by the buck converter circuit when the square wave signal is at one of the logic levels. The buck converter circuit is operable to modulate pulse width of the third DC electric power according to the control signal so as to output a current flowing through the LED module with a predetermined current value.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
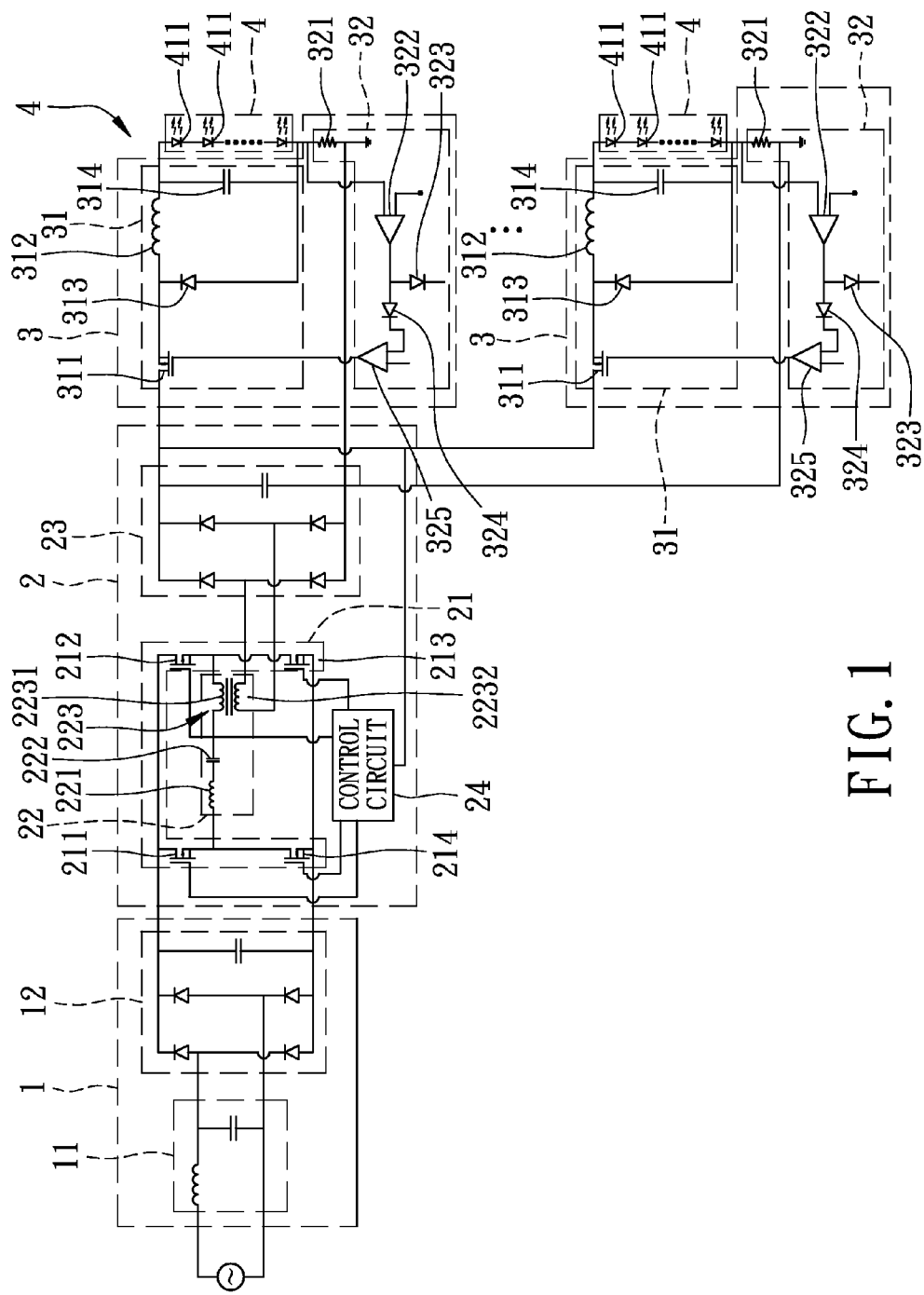
FIG. 1 is a circuit diagram of a preferred embodiment of an LED driving device according to the present invention.

Referring to FIG. 1, the preferred embodiment of a light emitting diode (LED) driving device according to the present invention is for driving a plurality of LED modules 4. Each of the LED modules 4 includes a plurality of LEDs 411.

The LED driving device includes an alternating current (AC) to DC converter module 1, a DC to DC converter module 2, and a plurality of driving modules 3.

The driving modules 3 are electrically connected to the LED modules 4 for driving the LED modules 4, respectively. The AC to DC converter module 1 includes a filtering circuit 11, and a converting circuit 12. The filtering circuit 11 is for receiving an input AC electric power and is for filtering out high frequency harmonic components of the input AC electric power to output a filtered AC electric power. The converting circuit 12 is electrically connected to the filtering circuit 11 for receiving the filtered AC electric power and for converting the filtered AC electric power into a first DC electric power.

The DC to DC converter module 2 includes a full-bridge switching circuit 21, a resonant circuit 22, a rectifier circuit 23, and a control circuit 24. The full-bridge switching circuit 21 is electrically connected to the converting circuit 12 of the AC to DC converter module 1 for receiving the first DC electric power and is for converting the first DC electric power into a first AC electric power. The resonant circuit 22 is electrically connected to the full-bridge switching circuit 21 for receiving the first AC electric power and for filtering out high frequency harmonic components of the first AC electric power to output a second AC electric power. The rectifier circuit 23 is electrically connected to the resonant circuit 22 for receiving the second AC electric power and for converting the second AC electric power to output a second DC electric power. The control circuit 24 is electrically connected to the full-bridge switching circuit 21 and the rectifier circuit 23 for receiving the second DC electric power from the rectifier circuit 23, for modulating a voltage of the second DC electric power, and for controlling switching operation of the full-bridge switching circuit 21 according to the voltage thus modulated, such that the rectifier circuit 23 outputs the second DC electric power with a predetermined voltage value.

In this embodiment, the full-bridge switching circuit 21 includes first, second, third and fourth switches 211 to 214 that are implemented using N-channel MOSFETs. The first switch 211 has a first terminal for receiving the first DC electric power, a second terminal, and a control terminal electrically connected to the control circuit 24. The second switch 212 has a first terminal electrically connected to the first terminal of the first switch 211, a second terminal, and a control terminal electrically connected to the control circuit 24. The third switch 23 has a first terminal electrically connected to the second terminal of the second switch 212, a second terminal for receiving the first DC electric power, and a control terminal electrically connected to the control circuit 24. The fourth switch 214 has a first terminal electrically connected to the second terminal of the first switch 211, a second terminal electrically connected to the second terminal of the third switch 213 and for receiving the first DC electric power, and a control terminal electrically connected to the control circuit 24. The second terminals of the first and second switches 211, 212 output the first AC electric power to be received by the resonant circuit 22.

Figure 2:
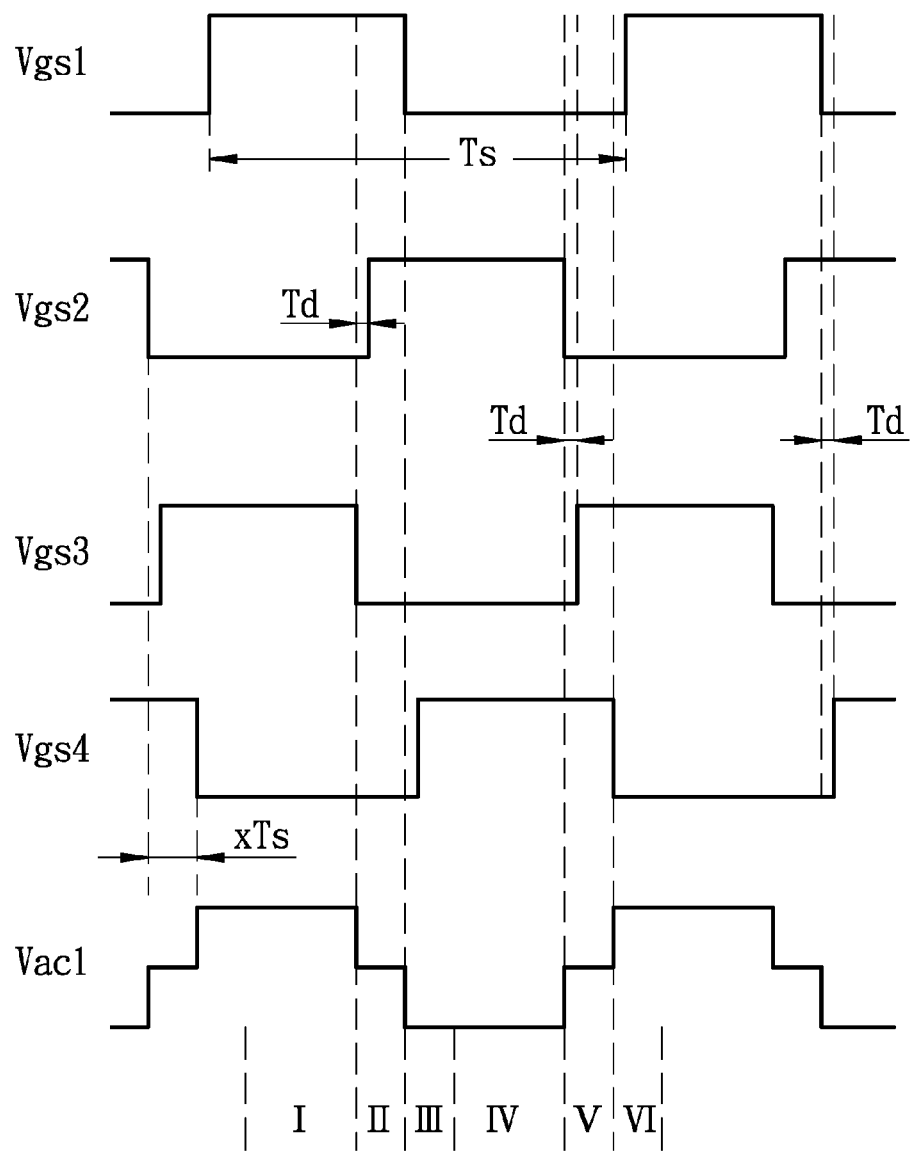
FIG. 2 illustrates timing sequences of various signals relevant to a DC to DC converter module of the LED driving device.

Further referring to FIG. 2, the control circuit 24 is operable to output first, second, third, and fourth control signals (Vgs1 to Vgs4) with reference to the second DC electric power for controlling the first, second, third and fourth switches 211 to 214, respectively. Each of the first to fourth control signals (Vgs1 to Vgs4) alternates between high and low logic levels, and durations of alternating cycles (Ts) of the first, second, third, and fourth control signals (Vgs1 to Vgs4) have identical length. The first control signal (Vgs1) alternates from the low logic level to the high logic level later than the fourth control signal (Vgs4) alternates from the high logic level to the low logic level by a dead time (Td), and the fourth control signal (Vgs4) alternates from the low logic level to the high logic level later than the first control signal (Vgs1) alternates from the high logic level to the low logic level by the dead time (Td). That is to say, the first and fourth control signals (Vgs1, Vgs4) are both at the low logic level during the dead time (Td).

Similarly, the third control signal (Vgs3) alternates from the low logic level to the high logic level later than the second control signal (Vgs2) alternates from the high logic level to the low logic level by the dead time (Td), and the second control signal (Vgs2) alternates from the low logic level to the high logic level later than the third control signal (Vgs3) alternates from the high logic level to the low logic level by the dead time (Td). The second and third control signals (Vgs2, Vgs3) are also both at the low logic level during the dead time (Td). The control circuit 24 is operable, according to the second DC electric power, to adjust a time difference (xTs) between the second and fourth control signals (Vgs2, Vgs4) alternating from the high logic level to the low logic level (i.e., a phase shift therebetween), so that the second DC electric power has the predetermined voltage value. It is noted that a duty cycle of each of the first, second, third and fourth control signals (Vgs1 to Vgs4) is 50% regardless of the dead time (Td).

In this preferred embodiment, the resonant circuit 22 includes an inductor 221, a capacitor 222, and a transformer 223. The transformer 23 includes a primary winding 2231 and a secondary winding 2232. The primary winding 2231 is in series connection with the inductor 221 and the capacitor 222, and is electrically connected to the full-bridge switching circuit 21 for receiving the first AC electric power. The inductor 221 is electrically connected to the second terminal of the first switch 212 of the full-bridge switching circuit 21. The primary winding 2231 is electrically connected to the second terminal of the second switch 212 of the full-bridge switching circuit 21. The secondary winding 2232 is electrically connected to the rectifier circuit 23, and is configured to output the second AC electric power.

Preferably, each of the first, second, third and fourth switches 211 to 214 of the full-bridge switching circuit 21 has a switching frequency, which is controlled by the respective one of first, second, third, and fourth control signals (Vgs1 to Vgs4), and which is greater than a resonance frequency of a loaded resonance formed by the inductor 221, the capacitor 222 and the transformer 223 of the resonant circuit 22, such that the resonant circuit 22 is an inductive circuit. Accordingly, the first DC electric power has a voltage with a phase leading with respect to a current of the first DC electric power. By this way, the first, second, third and fourth switches 211 to 214 of the full-bridge switching circuit 21 may alternate between the high and low logic levels at zero voltage, i.e., zero-voltage-switching (ZVS), to thereby effectively reduce electric energy loss attributed to switching operation of the full-bridge switching circuit 21. Furthermore, when the resonant circuit 22 has a relatively high load-quality factor, the resonant circuit 22 is capable of filtering out high frequency harmonic components of the first AC electric power. Thus, a current of the second AC electric power outputted by the resonant circuit 22 has a substantially sinusoidal waveform.

In this preferred embodiment, the full-bridge switching circuit 21 has sixth operating stages, i.e., first to six operating stages indicated by (I to VI) in FIG. 2. As shown in FIGS. 3 to 8, the elements illustrated in solid lines are turned on (conducting) whereas the elements illustrated in dotted lines are turned off (not conducting).

Figure 3:
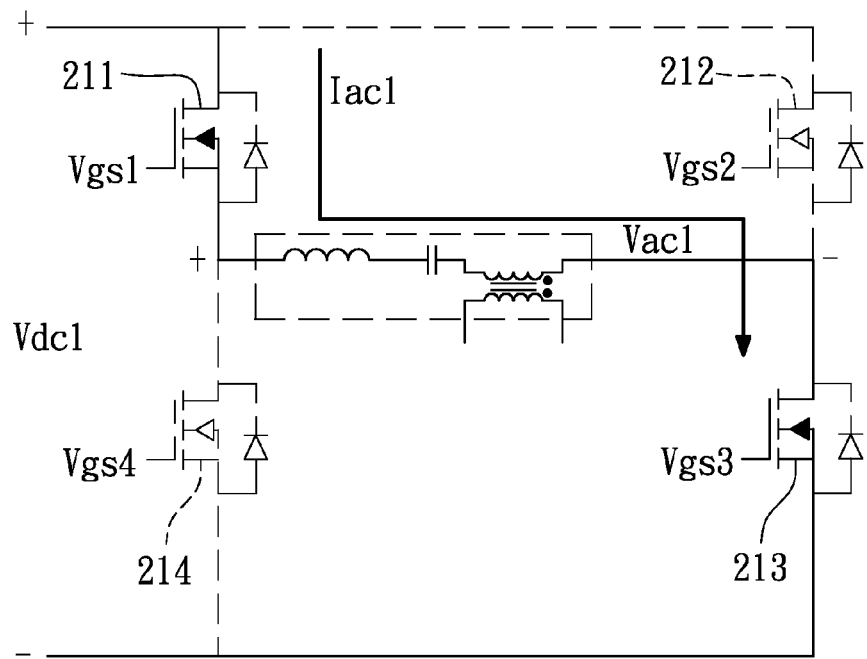
FIGS. 3 to 8 are circuit diagrams for illustrating current flow through a full-bridge switching circuit of the DC to DC converter module operating in different operating stages.

Referring to FIGS. 2 and 3, in the first operating stage (I), the first and third control signals (Vgs1, Vgs3) are at the high logic level, and the second and fourth control signals (Vgs2, Vgs4) are at the low logic level. As a result, the first and third switches 211, 213 are conducting and the second and fourth switches 212, 214 are not conducting. At this time, the first AC electric power has a current (Iac1) flowing through the first and third switches 211, 213, and has a voltage value (Vac1) equal to a voltage value (Vdc1) of the first DC electric power. When the third control signal (Vgs3) alternates from the high logic level to the low logic level, the third switch 213 is turned off and the full-bridge switching circuit 21 enters the second operating stage (II).

Figure 4:
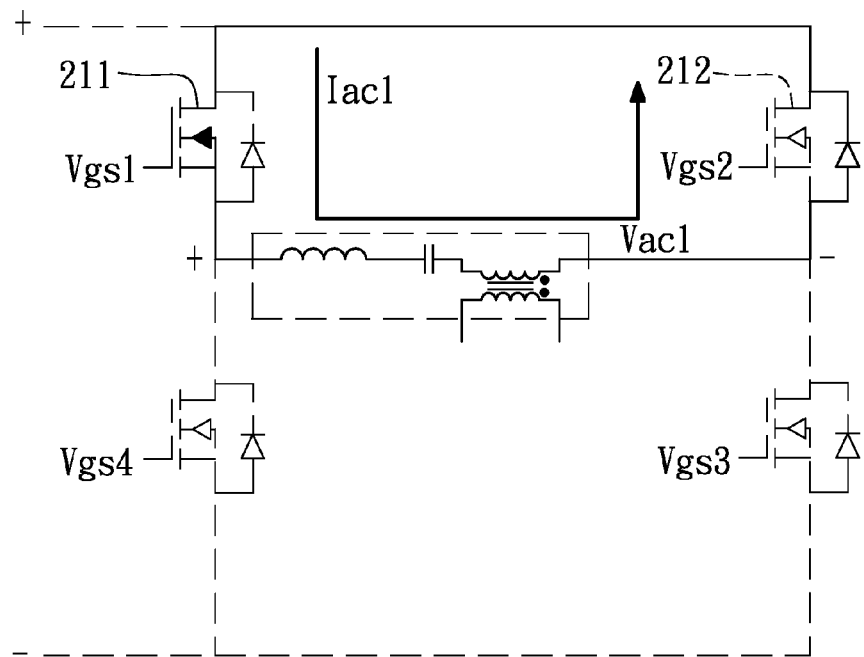

Referring to FIGS. 2 and 4, in the second operating stage (II), the current (Iac1) of the first AC electric power flows through the first switch 211, and a parasitic capacitor formed between the first and second terminals of the second switch 212 is discharged. When a voltage value across the first and second terminals of the second switch 212 decreases to −0.7V, a body diode of the second switch 212 is turned on and the voltage value across the first and second terminals of the second switch 212 remains at −0.7V. That is to say, when the dead time (Td) after the third control signal (Vgs3) alternating from the high logic level to the low logic level has elapsed, the second control signal (Vgs2) alternates from the low logic level to the high logic level. At this time, the first and second switches 211, 212 are turned on so as to result in a short circuit of the full-bridge switching circuit 21. The current (Iac1) of the first AC electric power flows through the first and second switches 211, 212.

The first switch 211 is turned off upon the first control signal alternating from the high logic level to the low logic level, and the full-bridge switching circuit 21 enters the third operating stage (III).

Figure 5:
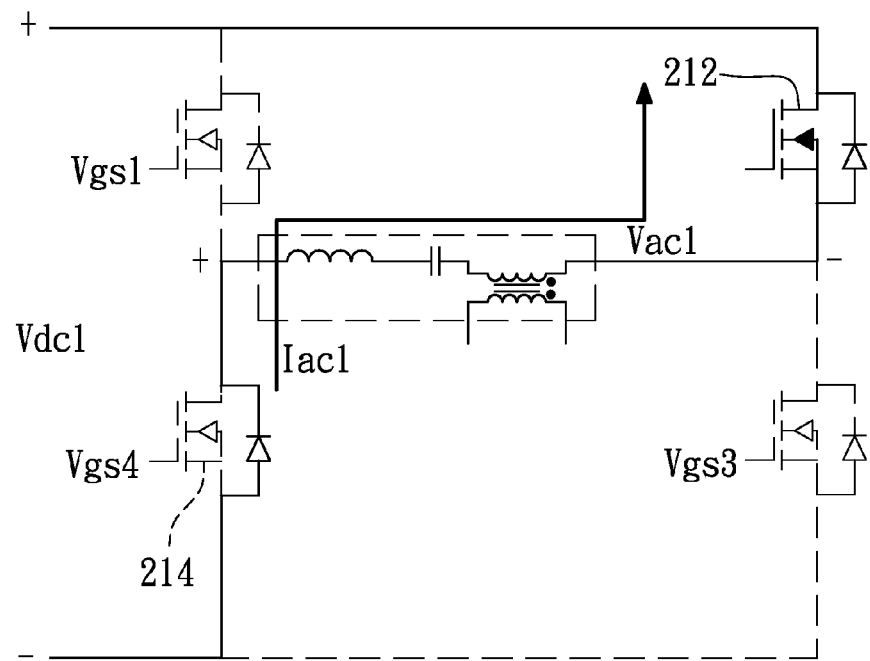

Referring to FIGS. 2 and 5, in the third operating stage (III), the current (Iac1) of the first AC electric power flows through the second switch 212 and a parasitic capacitor formed between the first and second terminals of the fourth switch 214 is discharged. When a voltage value across the first and second terminals of the fourth switch 214 decreases to −0.7V, a body diode of the fourth switch 212 is turned on and the voltage value across the first and second terminals of the fourth switch 214 remains at 0.7V. That is, when the dead time (Td) after the first control signal (Vgs1) alternating from the high logic level to the low logic level has elapsed, the fourth control signal (Vgs4) alternates from the low logic level to the high logic level. At this time, the second and fourth switches 212, 214 are turned on, so that the voltage value (Vac1) of the first AC electric power becomes equal to a negative value of the voltage value (Vdc1) of the first DC electric power. The current (Iac1) of the first AC electric power flows through the second switch 212 and the fourth switch 214. Note that voltage values across the second and fourth switches 212, 214 are respectively approximate to zero and the second and fourth control signals (Vgs2, Vgs4) have already alternated from the low logic level to the high logic level. After the current (Iac1) of the first AC electric power reaches zero and a polarity of the current (Iac1) begins to change, the second and the fourth switches 212, 214 are naturally turned on, thereby satisfying zero-voltage-switching (ZVS) to make the full-bridge switching circuit 21 enter the fourth operating stage (IV).

Figure 6:
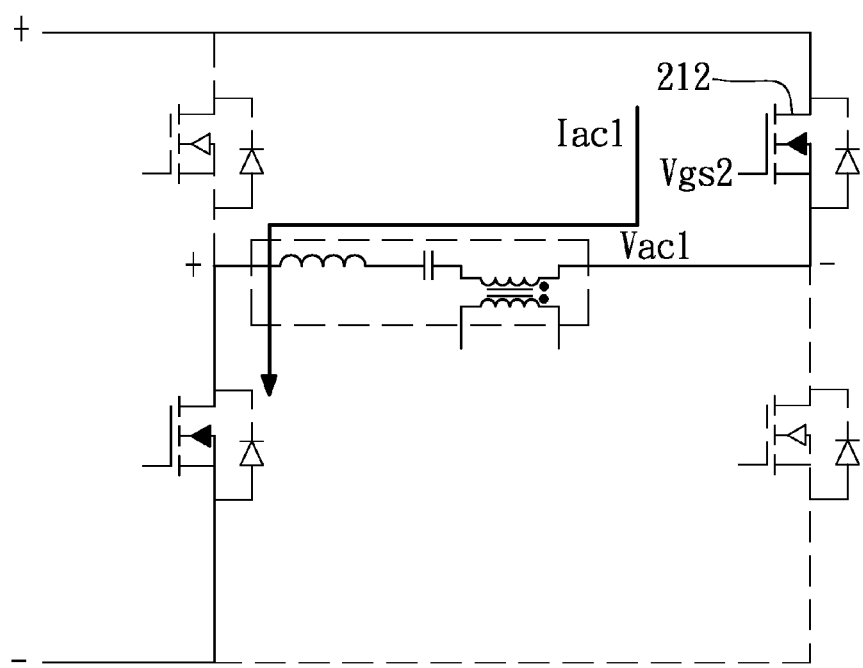

Referring to FIGS. 2 and 6, in the fourth operating stage (IV), the current (Iac1) of the first AC electric power flows through the second and fourth switches 212, 214, and the voltage value (Vac1) of the first AC electric power is equal to the negative value of the voltage value (Vdc1) of the first DC electric power. When the second control signal (Vgs2) alternates from the high logic level to the low logic level, the second switch 212 is turned off and the full-bridge switching circuit 21 enters the fifth operating stage (V).

Figure 7:
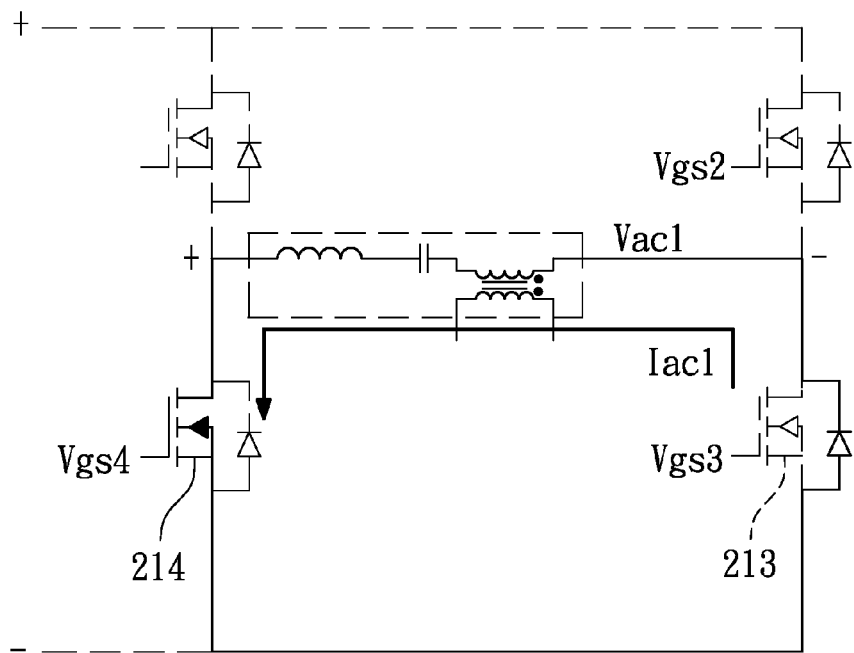

As shown in FIGS. 2 and 7, in the fifth operating stage (V), the current (Iac1) of the first AC electric power flows through the fourth switch 214, and a parasitic capacitor formed between the first and second terminals of the third switch 213 is discharged. When a voltage value across the first and second terminals of the third switch 213 decreases to −0.7V, a body diode of the third switch 213 is turned on and the voltage value across the first and second terminals of the third switch 213 remains at −0.7V. When the dead time (Td) after the second control signal (Vgs2) alternating from the high logic level to the low logic level has elapsed, the third control signal (Vgs3) alternates from the low logic level to the high logic level. At this time, the third and fourth switches 213, 214 are turned on so as to result in a short circuit of the full-bridge switching circuit 21, and the voltage value (Vac1) of the first AC electric power is equal to zero. The current (Iac1) of the first AC electric power flows through the third and fourth switches 213, 214. When the fourth control signal (Vgs4) alternates from the high logic level to the low logic level, the fourth switch 214 is turned off and the full-bridge switching circuit 21 enters the sixth operating stage (VI).

Figure 8:
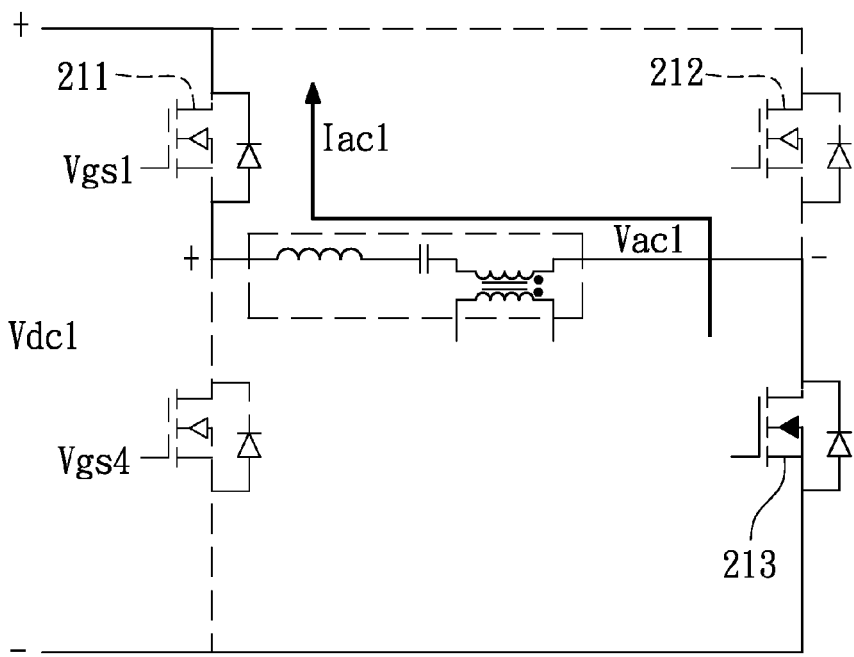

Referring to FIGS. 2 and 8, in the sixth operating stage (VI), the current (Iac1) of the first AC electric power flows through the third switch 213, and a parasitic capacitor formed between the first and second terminals of the first switch 211 is discharged. When a voltage value across the first and second terminal of the first switch 211 decreases to −0.7V, a body diode of the first switch 211 is turned on and the voltage value across the first and second terminals of the first switch 211 remains at −0.7V. That is to say, when the dead time (Td) after the fourth control signal (Vgs4) alternating from the high logic level to the low logic level has elapsed, the first control signal (Vgs1) alternates from the low logic level to the high logic level. At this time, the first and third switches 211, 213 are turned on, and the voltage value (Vac1) of the first AC electric power is equal to the voltage value (Vdc1) of the first DC electric power. The current (Iac1) of the first AC electric power flows through the first and third switches 211, 213. Note that voltage values respectively across the first and third switches 211, 213 are approximate to zero and the first and third control signals (Vgs1, Vgs3) have already alternated from the low logic level to the high logic level. After the current (Iac1) of the first AC electric power reaches zero and a polarity of the current (Iac1) begins to change, the first and the third switches 211, 213 are naturally turned on, thereby satisfying zero-voltage-switching (ZVS) to make the full-bridge switching circuit 21 enter the firth operating stage (I).

Referring back to FIG. 1, note that since the configurations of the driving modules 3 are substantially the same, only one of the driving modules 3 and a corresponding one of the LED modules 4 will be illustrated in the following description for the sake of brevity.

The driving module 3 includes a buck converter circuit 31 and a control circuit 32. The buck converter circuit 31 is electrically connected to the rectifier circuit 23 for receiving the second DC electric power therefrom, and is operable to buck convert the second DC electric power into a third DC electric power to be provided to the LED module 4 for driving the LED module 4. The control circuit 32 is electrically connected to the buck converter circuit 31 and is disposed to receive a square wave signal alternating between low and high logic levels. The control circuit 32 is operable to output a control signal to be received by the buck converter circuit 32 when the square wave signal is at the high logic level.

The buck converter circuit 31 is operable to modulate pulse width of the third DC electric power according to the control signal so as to output a current flowing through the LED module 4 with a predetermined current value.

In this preferred embodiment, the buck converter circuit 31 includes a switch component 311, an inductor 312, a free-wheeling diode 313, and a capacitor 314. The switch component 311 has a first terminal electrically connected to the rectifier circuit 23 for receiving the second DC electric power, a second terminal, and a control terminal. The inductor 312 has a first end electrically connected to the second terminal of the switch component 311, and a second end for outputting the third DC electric power. The free-wheeling diode 313 has an anode, and a cathode that is electrically connected to the second terminal of the switch component 311. The capacitor 314 is electrically connected between the second end of the inductor 312 and the anode of the free-wheeling diode 313, and is electrically connected in parallel to the LED module 4.

The control circuit 32 includes a resistor 321, an amplifier 322, a first diode 323, a second diode 324, and a comparator 325. The resistor 321 is electrically connected to the LED module 4 for receiving the current flowing through the LED module 4 and resulting in a detected voltage value across the resistor 321. The amplifier 322 has a first input terminal electrically connected to the resistor 321 for receiving the detected voltage therefrom, a second input terminal for receiving a reference voltage that is associated with the predetermined current value flowing through the LED module 4, and an output terminal. The first diode 323 has an anode electrically connected to the output terminal of the amplifier 322 and a cathode for receiving the square wave signal. The second diode 324 has an anode electrically connected to the output terminal of the amplifier 322 and a cathode. The comparator 325 has a first input terminal for receiving a sawtooth wave signal, a second input terminal electrically connected to the cathode of the second diode 324, and an output terminal electrically connected to the control terminal of the switch component 311 of the buck converter circuit 31 and configured for outputting the control signal with reference to the sawtooth wave signal. It is noted that the frequency of the square wave signal is smaller than that of the sawtooth wave signal.

Figure 9:
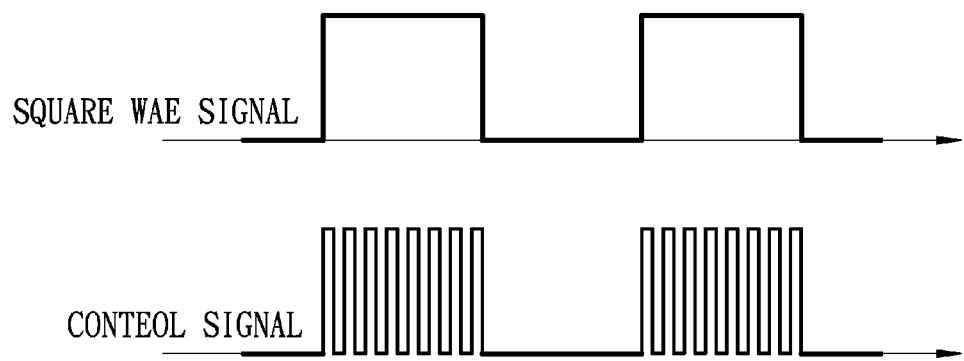
FIG. 9 illustrates timing sequences of a square wave signal and a control signal relevant to a driving module of the LED driving device.

Further referring to FIG. 9, when the square wave signal is at the low logic level, the first diode 323 is conducting and a voltage at the anode of the second diode 324 is clamped to a low logic level, such that the second diode 324 is not conducting. As a result, no control signal is received by the switch component 311 of the buck converter circuit 31, and the switch component 311 is not turned on. The capacitor 314 of the buck converter circuit 31 is discharged quickly when a voltage value across the capacitor 314 is reduced to below a driving voltage value of the LED module 4, such that no current flows through the LED module 4.

On the contrary, when the square wave signal is at the high logic level, the first diode 323 is not conducting, and the amplifier 322 amplifies and outputs the difference between the detected voltage from the resistor 321 and the reference voltage to the second terminal of the comparator 325 through the second diode 324. The comparator 325 outputs the control signal in a form of a square wave according to the sawtooth wave signal and the amplified difference received thereby. When the detected voltage across the resistor 321 is smaller than the reference voltage, the duty cycle of the switch component 311 of the buck converter circuit 31 is increased. On the other hand, when the detected voltage is larger than the reference voltage, the duty cycle of the switch component 311 is decreased. By this way, the buck converter circuit 31 modulates the pulse width of the third DC electric power according to the control signal so as to output the current flowing through the LED module 4 with the predetermined current value.

To sum up, the control circuit 32 outputs the control signal when the square wave signal is at the high logic level, and the buck converter circuit 31 modulates the pulse width of the third DC electric power according to the control signal, such that the current flowing through the LED module 4 has the predetermined current value. Furthermore, when the pulse width of the square wave signal is modulated, the average current value flowing through the LED module 4 is changed accordingly.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A light emitting diode (LED) driving device for driving an LED module, said LED driving device comprising:
   a direct current (DC) to DC converter module including
      a full-bridge switching circuit for receiving a first DC electric power and for converting the first DC electric power into a first alternating current (AC) electric power,
      a resonant circuit electrically connected to said full-bridge switching circuit for receiving the first AC electric power and for filtering out high frequency harmonic components of the first AC electric power to output a second AC electric power,
      a rectifier circuit electrically connected to said resonant circuit for receiving the second AC electric power and for converting the second AC electric power to output a second DC electric power, and
      a first control circuit electrically connected to said full-bridge switching circuit and said rectifier circuit for receiving the second DC electric power from said rectifier circuit, for modulating a voltage of the second DC electric power, and for controlling switching operation of said full-bridge switching circuit according to the voltage thus modulated, such that said rectifier circuit outputs the second DC electric power with a predetermined voltage value; and
   a driving module including
      a buck converter circuit electrically connected to said rectifier circuit for receiving the second DC electric power therefrom and operable to buck convert the second DC electric power into a third DC electric power to be provided to the LED module for driving the LED module, and
      a second control circuit electrically connected to said buck converter circuit and disposed to receive a square wave signal alternating between two logic levels, said second control circuit being operable to output a control signal to be received by said buck converter circuit when the square wave signal is at one of the logic levels, said buck converter circuit being operable to modulate pulse width of the third DC electric power according to the control signal so as to output a current flowing through the LED module with a predetermined current value.

2. The LED driving device as claimed in claim 1, further comprising an AC to DC converter module including:
   a filtering circuit for receiving an input AC electric power and for filtering out high frequency harmonic components of the input AC electric power to output a filtered AC electric power; and
   a converting circuit electrically connected to said filtering circuit for receiving the filtered AC electric power and for converting the filtered AC electric power into the first DC electric power to be received by said full-bridge switching circuit.

3. The LED driving device as claimed in claim 1, wherein said second control circuit includes:
   a resistor adapted to be electrically connected to the LED module for receiving the current flowing through the LED module and resulting in a detected voltage value across said resistor;
   an amplifier having a first input terminal electrically connected to said resistor for receiving the detected voltage therefrom, a second input terminal for receiving a reference voltage that is associated with the predetermined current value, and an output terminal;
   a first diode having an anode electrically connected to said output terminal of said amplifier and a cathode for receiving the square wave signal;
   a second diode having an anode electrically connected to said output terminal of said amplifier, and a cathode; and
   a comparator having a first input terminal for receiving a sawtooth wave signal, a second input terminal electrically connected to said cathode of said second diode, and an output terminal electrically connected to said buck converter circuit and for outputting the control signal with reference to the sawtooth wave signal.

4. The LED driving device as claimed in claim 3, wherein said buck converter circuit includes:
   a switch component having a first terminal electrically connected to said rectifier circuit for receiving the second DC electric power, a second terminal, and a control terminal electrically connected to said output terminal of said comparator of said second control circuit for receiving the control signal;

an inductor having a first end electrically connected to said second terminal of said switch component, and a second end for outputting the third DC electric power;

a free-wheeling diode having an anode, and a cathode electrically connected to said second terminal of said switch component; and a capacitor electrically connected between said second end of said inductor and said anode of said free-wheeling diode, and adapted to be electrically connected in parallel to the LED module.

5. The LED driving device as claimed in claim 1, wherein said resonant circuit includes:

an inductor;

a capacitor; and a transformer that includes a primary winding being in series connection with said inductor and said capacitor and electrically connected to said full-bridge switching circuit for receiving the first AC electric power, and a secondary winding electrically connected to said rectifier circuit and outputting the second AC electric power.

6. The LED driving device as claimed in claim 5, wherein said full-bridge switching circuit includes:

a first switch having a first terminal for receiving the first DC electric power, a second terminal electrically connected to said inductor of said resonant circuit, and a control terminal electrically connected to said first control circuit;

a second switch having a first terminal electrically connected to said first terminal of said first switch, a second terminal electrically connected to said primary winding of said transformer of said resonant circuit, and a control terminal electrically connected to said first control circuit;

a third switch having a first terminal electrically connected to said second terminal of said second switch, a second terminal for receiving the first DC electric power, and a control terminal electrically connected to said first control circuit; and a fourth switch having a first terminal electrically connected to said second terminal of said first switch, a second terminal electrically connected to said second terminal of said third switch and for receiving the first DC electric power, and a control terminal electrically connected to said first control circuit.

7. The LED driving device as claimed in claim 6, wherein said first control circuit is operable to output first, second, third, and fourth control signals with reference to the second DC electric power for controlling said first, second, third and fourth switches, respectively, each of the first to fourth control signals alternating between high and low logic levels, durations of alternating cycles of the first, second, third, and fourth control signals having identical length;

wherein the first control signal alternates from the low logic level to the high logic level later than the fourth control signal alternates from the high logic level to the low logic level by a dead time, and the fourth control signal alternates from the low logic level to the high logic level later than the first control signal alternates from the high logic level to the low logic level by the dead time;

wherein the third control signal alternates from the low logic level to the high logic level later than the second control signal alternates from the high logic level to the low logic level by the dead time, and the second control signal alternates from the low logic level to the high logic level later than the third control signal alternates from the high logic level to the low logic level by the dead time; and wherein said first control circuit is operable, according to the second DC electric power, to adjust a time difference between the second and fourth control signals alternating from the low logic level to the high logic level, so that the second DC electric power has the predetermined voltage value.

8. The LED driving device as claimed in claim 1, wherein said LED driving device is configured for driving a plurality of the LED modules, and comprises a plurality of said driving modules adapted to be electrically connected to the LED modules for driving the LED modules, respectively.

\* \* \* \* \*